US007866603B2

(12) United States Patent
Cooper et al.

(10) Patent No.: US 7,866,603 B2

(45) Date of Patent: Jan. 11, 2011

(54) METHODS AND APPARATUS FOR AN AIRCRAFT LAVORATORY

(75) Inventors: Ben M. Cooper, Lynnwood, WA (US); Bryan D. Moran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 11/741,710

(22) Filed: Apr. 27, 2007

(65) Prior Publication Data

US 2008/0265092 A1 Oct. 30, 2008

(51) Int. Cl.
*B64D 11/00* (2006.01)

(52) U.S. Cl. ................................ 244/118.5; 244/117 R

(58) Field of Classification Search ............. 244/117 R, 244/118.5

See application file for complete search history.

(56) References Cited

U.S. PATENT DOCUMENTS 882,760 A * 3/1908 Hubert .......................... 52/32
2,650,368 A * 9/1953 Randolph ...................... 52/34
4,884,767 A * 12/1989 Shibata .................... 244/118.5
5,065,462 A * 11/1991 Romano ........................ 4/604
5,150,863 A * 9/1992 Hozumi ................... 244/118.5
5,560,050 A * 10/1996 Tagg ............................ 4/449
5,566,404 A * 10/1996 Laughton ....................... 4/619
6,007,025 A * 12/1999 Coughren et al. ........ 244/118.6
6,079,669 A * 6/2000 Hanay et al. ............. 244/118.5
6,101,766 A * 8/2000 Mogensen ..................... 52/34
6,131,213 A * 10/2000 Sarff .......................... 4/576.1
6,460,204 B1 * 10/2002 Krist et al. ...................... 4/663
6,604,709 B1 * 8/2003 Wentland et al. ......... 244/118.5
6,615,421 B2 * 9/2003 Itakura .......................... 4/664
6,889,936 B1 * 5/2005 Pho et al. ................. 244/118.5
6,938,284 B2 * 9/2005 Kitade et al. ................... 4/664
2003/0140571 A1 * 7/2003 Muha et al. .................. 52/79.1
2003/0155466 A1 * 8/2003 Wentland et al. ......... 244/118.5
2005/0116099 A1 * 6/2005 Pho et al. ................. 244/118.5

OTHER PUBLICATIONS

Access board-ADAAG http://www.access-board.gov/adaag/html/intro.htm pp. 1-3 published 2002.*
http://www.access-board.gov/adaag/ADAAG.pdf p. 55 Published 2002.*
http://www.access-board.gov/adaag/ADAAG.pdf p. 46 Published 2002.*
U.S. Department of Transportation, 14CFR Part 382, Nondiscriminatory on the Basis of Disability in Air Travel.

* cited by examiner

*Primary Examiner*—Timothy D Collins
*Assistant Examiner*—Justin Benedik
(74) *Attorney, Agent, or Firm*—Tung & Associates

(57) ABSTRACT

A handicapped-accessible aircraft lavatory includes a wheelchair region, a toilet assembly adjacent to and oriented at a non-zero angle with respect to the wheelchair region, and a sink assembly adjacent to the toilet assembly. The sink assembly includes a basin positioned at a predetermined height and a predetermined lateral distance with respect to the toilet seat, wherein the predetermined height and the predetermined distance are selected such that the sink assembly is within arms-reach of a passenger (e.g., a 95$^{th}$ percentile male passenger) sitting on the toilet seat. Additional amenities such as mirrors, toilet paper, tissues, and the like may also be similarly positioned.

17 Claims, 4 Drawing Sheets

310
210
602
603
340
220

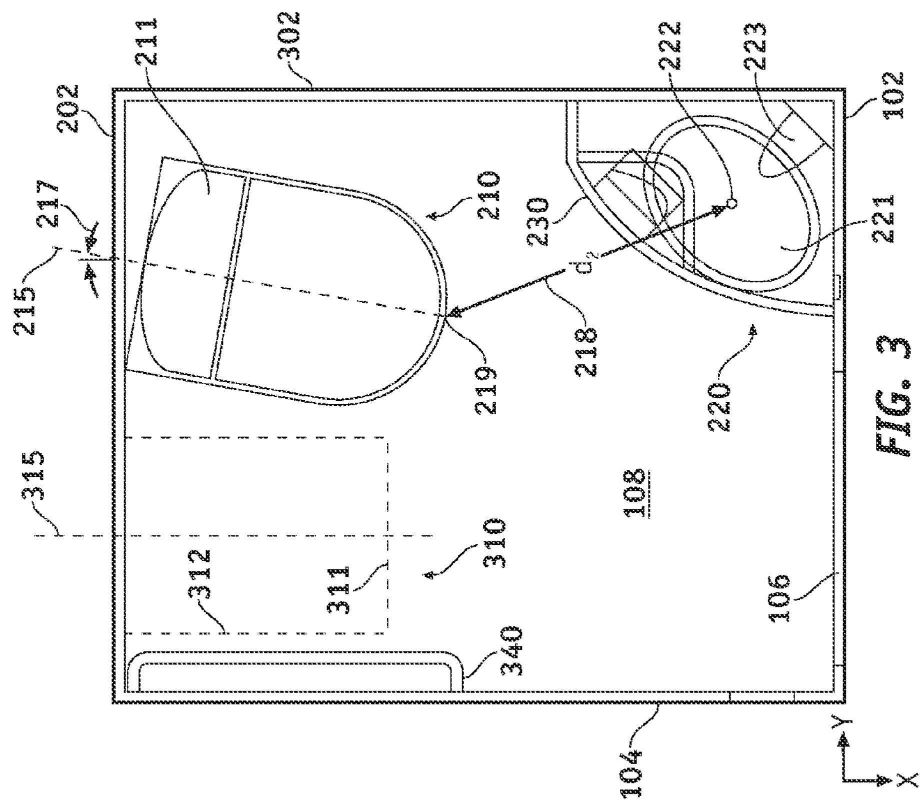
FIG. 3
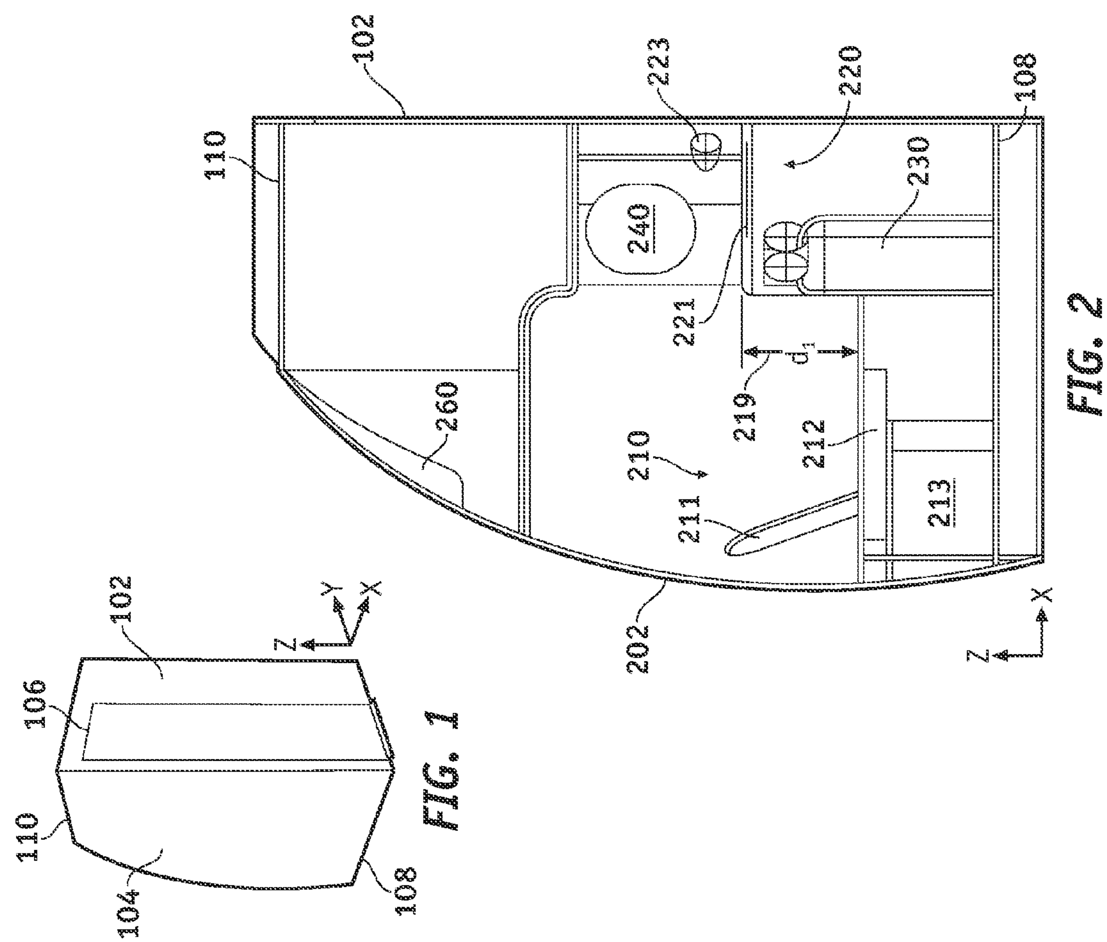
FIG. 2
FIG. 1

METHODS AND APPARATUS FOR AN AIRCRAFT LAVORATORY

TECHNICAL FIELD

The embodiments described herein generally relate to aircraft lavatories, and more particularly relate to methods and apparatus for providing handicapped access to aircraft lavatories.

BACKGROUND

The majority of modern commercial aircraft designs incorporate some form of lavatory—i.e., a facility of the type customarily used by airline passengers for various hygienic functions. There has been increased interest in the last few decades in improving the accessibility of aircraft lavatories to handicapped passengers, prompting the promulgation of various related laws and administrative rules. See, for example, Air Carrier Access Act of 1986 (49 U.S.C. 41705); DOT Rule 14 C.F.R. 382 (2003), "Nondiscrimination on the Basis of Disability in Air Travel."; Suggested Guidelines for Accessible Lavoratories in Twin Aisle Aircraft, Ad Hoc Working Group on Design Guidelines (1992); and Lavatory Accessibility in Single-Aisle Aircraft: Final Report of the Aircraft Accessibility Federal Advisory Committee, Office of Environment, Energy, and Safety, Office of the Secretary of Transportation (1993).

Prior art lavatory designs are unsatisfactory in a number of respects, even when designed in accordance with the foregoing rules and standards. For example, accessibility and ergonomics often focus on lateral transfer or simply "transfer" of the passenger—e.g., the physical movement of an individual between a wheel chair and a lavatory toilet seat. This transfer might be effected by the passenger himself (e.g., independent transfer), or might involve physical assistance by another individual (dependent transfer). In many current lavatory designs, the geometry and position of the toilet with respect to the area reserved for the toilet seat (if such exists) is non-optimal, and transfer can be extremely difficult to effect.

Furthermore, the sink and sink basin in prior art lavatories are often too high and/or too far away for the passenger to effectively use the sink while seated on the toilet assembly. Even in instances where the sink basin is theoretically with reach, its height is such that the resulting angle results in water running down the passenger's arms. Similarly, the passenger often cannot reach the toilet paper, towels, cups, facial tissues, or other amenities such as mirrors and the like.

In addition, the distance from the front of the toilet seat to the side wall in such lavatories is often very small, resulting in a tight fit, and making it difficult for the passenger to move without bumping an elbow or other body part against the wall during transfer. Furthermore, the wheelchair region is often extremely large, allowing the on-board chair to move laterally in an undesirable manner.

Accordingly, it is desirable to provide aircraft lavatories that are configured to provide improved access and operation to handicapped individuals Furthermore, other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for an improved handicapped-accessible aircraft lavatory In one embodiment, the lavatory comprises a wheelchair region, a toilet assembly adjacent to and oriented at a non-zero angle with respect to the wheelchair region, the toilet assembly including a toilet seat; and a sink assembly adjacent to the toilet assembly, the sink assembly having a basin positioned at a predetermined height and a predetermined lateral distance with respect to the toilet seat, wherein the predetermined height and the predetermined distance are selected such that the sink assembly is within arms-reach of a passenger (e.g., ranging from a $5^{th}$-percentile female to a $95^{th}$-percentile male) sitting on the toilet seat.

A method of manufacturing a lavatory within an aircraft generally includes: defining a lavatory area within the aircraft; defining a wheelchair region within the lavatory; installing a toilet assembly within the lavatory area such that it is adjacent to and oriented at a non-zero angle with respect to the wheelchair region, wherein the toilet assembly includes a toilet seat; and installing a sink assembly adjacent to the toilet assembly, the sink assembly having a basin positioned at a predetermined height and a predetermined lateral distance with respect to the toilet seat such that the sink assembly is within arms-reach of a passenger sitting on the toilet seat. Properly positioned and oriented assist bars may also be provided to assist the passenger in performing toiletry operations.

BRIEF DESCRIPTION OF THE DRAWINGS

Various embodiments will hereinafter be described in conjunction with the following drawing figures, wherein like numerals denote like elements, and FIG. 1 is an isometric overview of the exterior of a lavatory in accordance with one embodiment;

FIG. 2 is a side view of a lavatory in accordance with one embodiment;

FIG. 3 is a top view of a lavatory in accordance with the embodiment of FIG. 2;

DETAILED DESCRIPTION

Figure 4:
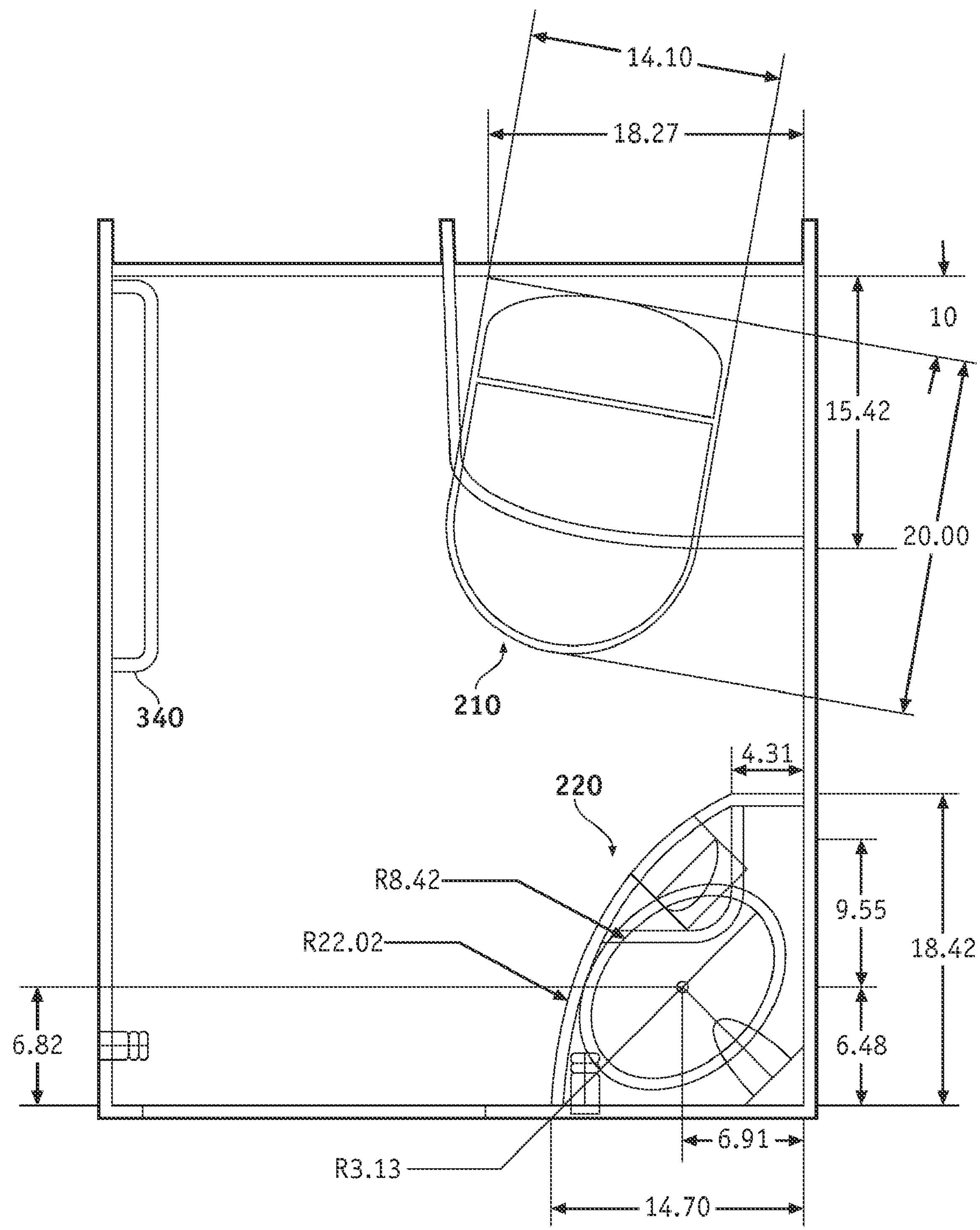
FIG. 4 is the top view of FIG. 3 with exemplary dimensions.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, “connected” means that one element/node/feature is directly joined to (or directly communicates with) another element/node/feature, but not necessarily mechanically. Likewise, unless expressly stated otherwise, “coupled” means that one element/node/feature is directly or indirectly joined to (or directly or indirectly communicates with) another element/node/feature, but not necessarily mechanically.

The terms “comprise,” “include,” “have” and any variations thereof are used synonymously to denote non-exclusive inclusion. The terms “left,” right,” “in,” “out,” “front,” “back,” “up,” “down,” and other such directional terms are used to describe relative positions, not necessarily absolute positions in space. The term “exemplary” is used in the sense of “example,” rather than “ideal.”

In the interest of conciseness, conventional techniques, structures, and principles known by those skilled in the art may not be described herein, including, for example, conventional aircraft structural design, basic principles of toilet operation, and various FAA guidelines relating to lavatory standards. Additional information regarding accessibity standards may be found, for example, in Air Carrier Access Act of 1986 (49 U.S.C. 41705); DOT Rule 14 C.F.R. 382 (2003), “Nondiscrimination on the Basis of Disability in Air Travel.”; Suggested Guidelines for Accessible Lavoratories in Twin Aisle Aircraft, Ad Hoc Working Group on Design Guidelines (1992); and Lavatory Accessibility in Single-Aisle Aircraft: Final Report of the Aircraft Accessibility Federal Advisory Committee, Office of Environment, Energy, and Safety, Office of the Secretary of Transportation (1993).

Referring to the simplified isometric external view depicted in FIG. 1, a lavatory 100 generally includes a door 106, a front wall 102, a top wall (or ceiling) 110, a floor 108, and various sidewalls (such as wall 104). Lavatory 100 may have any convenient shape, and is not limited to the generally curvilinear embodiment shown in the figures. In general, lavatory 100 will be configured to fit into the hull of a particular commercial airliner or other aircraft whose dimensions are known. Lavatory 100 is thus typically integrated into an aircraft structure such that one or more of the external surfaces illustrated in FIG. 1 are not themselves visible.

Door 106 typically opens out, and is configured to allow a wheelchair (such as an onboard wheelchair) to roll therethrough under the power of a passenger or assisting person. In this regard, the terms “passenger” and “individual” are used interchangeably. In some contexts, a particular human model is referred to (e.g., a “95$^{th}$-percentile male”). The range of embodiments, however, is not so limited.

FIG. 2 depicts and exemplary interior side view of lavatory 100, and FIG. 3 depicts a corresponding top view of the interior. As shown, lavatory 100 generally includes a toilet assembly 210, a sink assembly 220, and a wheelchair region 310 generally adjacent to toilet assembly 210. Lavatory 100 might include other features which, for the purposes of clarity, are not illustrated, such as a call button and associated call light (illuminated to advise a flight attendant to assist a passenger within lavatory 100). Other assistive equipment such as hand bars, hand grips, projections, platforms, signage, and lighting configured to facilitate an individual’s use of lavatory 100. Various amenities such as toilet paper, soap, paper towels, and the like are conventionally provided (e.g., in an upper mirror cabinet, sink cabinet, sink basin, etc.). Lavatory 100 may also include one or more mirrors (e.g., mirror 240) or storage areas 260.

In accordance with various embodiments as described below, the position and geometry of the lavatory components are selected to provide improved transfer of the passenger from a wheelchair to the lavatory toilet assembly 210 while at the same time providing improved access to the lavatory sink assembly 220 and other amenities. More particularly, according to one embodiment, toilet assembly 210 is advantageously angled with respect to adjacent wheelchair region 310 to provide easy transfer, while sink assembly 220 is positioned at a height and distance that allows a passenger seated on toilet assembly 210 to access sink assembly 220 after transfer is effected.

With continued reference to FIGS. 2 and 3, toilet assembly 210 generally includes a lid 211, a toilet seat (or “seating surface”) 212, a toilet support structure and/or toilet plumbing structure 213, and a toilet flush control (not shown). Toilet assembly 210 has a major axis 215—e.g., a biaxial line of symmetry intersecting the leading edge 320 of toilet seat 212 and generally extending toward the back of toilet assembly 210. Toilet assembly 210 may comprise a shroud configured to fit over the functional structures of the toilet plumbing, as is common in the art. For the purposes of simplicity, an integrated toilet assembly 210 is illustrated.

Sink assembly 220 includes a basin 221 (e.g., a generally concave basin), faucet assembly 223 (e.g., an automatic faucet), and drain control (not illustrated), which together provide water for hand washing and the like. In the illustrated embodiment, toilet assembly 210 is generally adjacent to sink assembly 220, which may be secured to wall 302. Basin 221 need not be elliptical, as illustrated, and may have any suitable shape.

Wheelchair region 310 is generally adjacent to toilet assembly 210, and is configured to accommodate a wheel chair (e.g., an onboard wheelchair) having a passenger seated therein. Wheelchair region 310 may be defined by a footprint that is generally rectangular (having a width 311 and length 312), and has an orientation defined by its major axis 315. In the illustrated embodiment, wheelchair region 310 is defined opposite (and aligned with) door 106 such that the passenger (with or without assistance) may manipulate the wheelchair through the doorway backwards and travel substantially straight back to come to rest within wheelchair region 310. Stated another way, the major axis 315 of wheelchair region 310 is generally co-linear with the center of door 106.

To facilitate transfer, toilet assembly 210 is generally positioned at a non-zero angle with respect to wheelchair region 310. As previously mentioned, “transfer” (or “lateral transfer”) means the physical movement of a passenger between a wheel chair and a lavatory toilet seat (or between any other two reasonably even surfaces). This transfer might be effected by the passenger himself (e.g., independent transfer), or might involve physical assistance by another individual (dependent transfer).

Thus, according with the illustrated embodiment, the respective major axes of toilet assembly 210 and wheelchair region 310 are non-parallel. In the case where wall 202 in back of toilet assembly 210 is generally planar, and wheelchair region 310 is generally perpendicular to wall 202, major axis 215 and major axis 315 define a non-zero angle 217. In one embodiment, angle 217 is between about 5.0 and 15.0 degrees, and in a particular embodiment is about 10.0 degrees. This non-zero angle assists with transfer in that the motion of an individual from a wheelchair to an adjacent chair is generally a rotational/translational movement rather than a simple parallel translational movement. This is particularly the case in assisted transfers, where the assisting individual will generally stand in place (in front of both toilet assembly 210 and wheelchair region 310) and grasp the passenger such that he is supported for a pivoting movement from one seat to another. Furthermore, in an embodiment wherein wall 302 is generally perpendicular to wall 202, the nonzero angle 217 will prevent the passengers left arm from contacting and bumping wall 302 while seated on toilet assembly 210.

To facilitate use of sink assembly 220 by the passenger when seated on toilet assembly 210, a reference point within the sink (e.g., the center or centroid 222 of basin 221) is close enough to a reference point on toilet assembly 210 (e.g., its leading edge 320) that the passenger is capable of operating faucet assembly 223 and washing his hands in basin 221 while seated on toilet assembly 210. In FIG. 3, this lateral distance is designated by distance 218 ($d_2$) extending from leading edge 320 of toilet seat 212 to the centroid 222 of sink basin 221. This lateral distance $d_2$ is selected such that basin 221 is within arms-reach of the passenger when seated on toilet assembly 210, where "arms-reach" refers to the anticipated arm length of a representative passenger—e.g., ranging from a $5^{th}$-percentile female to a $95^{th}$-percentile male or any other suitable anatomical norm. Such norms are described, for example, in Henry Dreyfuss Associates, *The Measure of Man & Woman: Human Factors in Design* (2001). In the illustrated embodiment, $d_2$ is between about 18 and 22 inches—e.g., about 20 inches.

Figure 7:
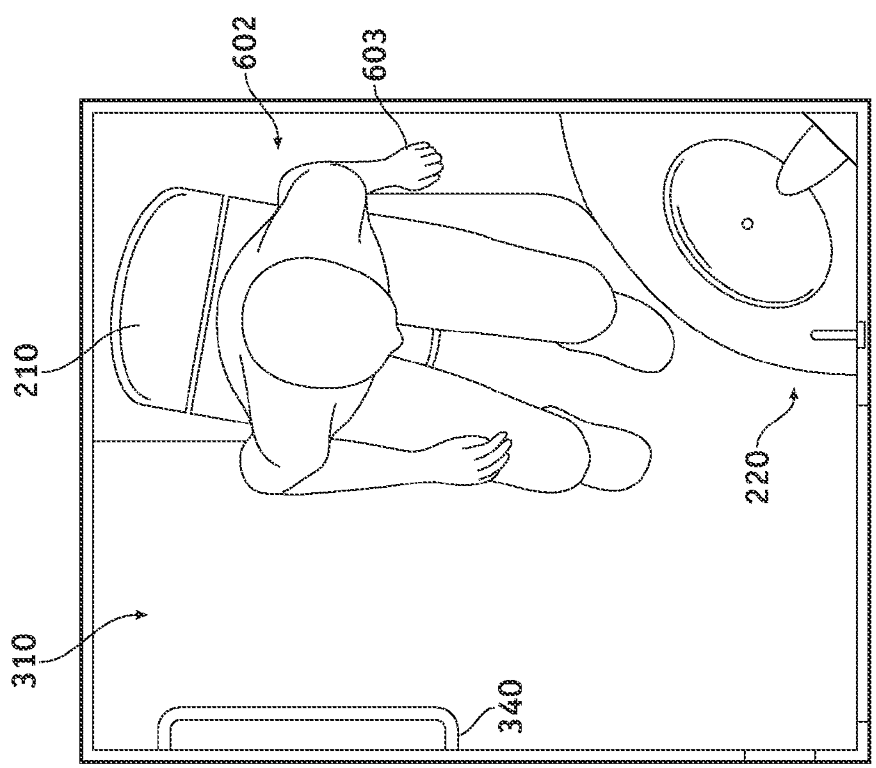
FIG. 7 is a top view of the exemplary lavatory shown in FIG. 6.
Figure 6:
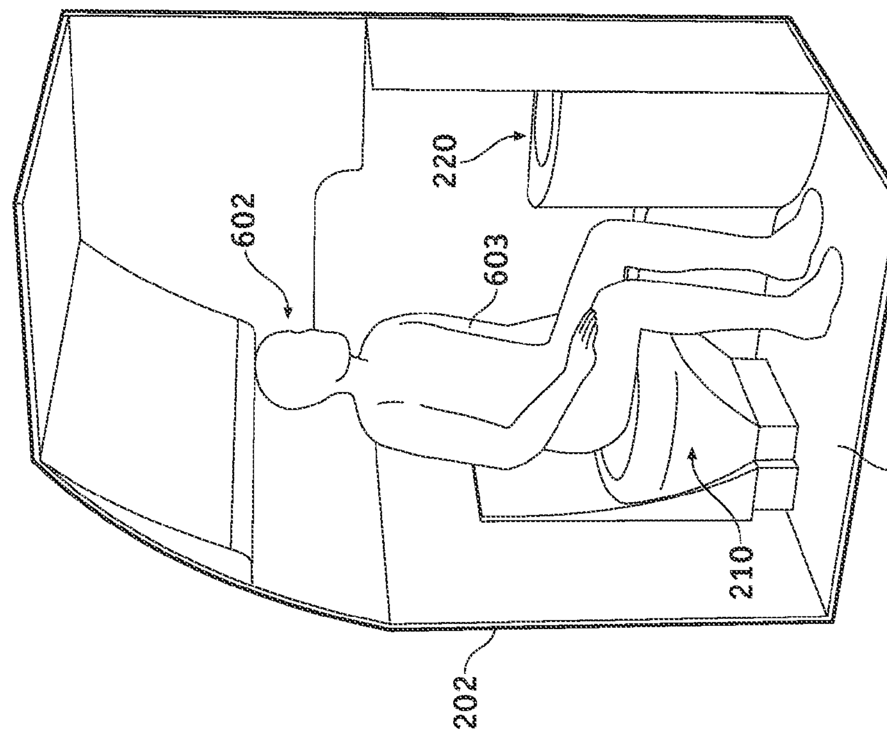
FIG. 6 is an isometric view of a passenger seated within an exemplary lavatory embodiment.

To further facilitate use of sink assembly 220, and to allow a passenger to use the sink without water rolling down his arms, the height of basin 221 is advantageously located with respect to the height of seat 212 of toilet 210. This distance is designated as distance 219 ($d_1$) in FIG. 2, and extends vertically from the top of seat 212 of toilet assembly 210 to the top surface of sink basin 221. Distance $d_1$ may be computed based the anticipated arm length and torso dimensions of a 97 percentile male, or any other suitable criterion. In one embodiment, $d_1$ is between about 8 and 12 inches—e.g., about 10 inches. In a particular embodiment, the top of basin 221 is placed at an advantageous height from floor 108—e.g., about 30 inches, while seat 212 of toilet assembly 210 is about 16-18 inches (e.g., 17 inches) from floor 108. In this regard, FIGS. 6 and 7 are simplified isometric and top views of a lavatory interior showing a representative passenger 602 (e.g., a $5^{th}$-percentile or a $97^{th}$ percentile male) sitting on toilet assembly 210. As can be seen, when passenger 602 extends his arms (602 and 604), he can easily reach sink assembly 220, and can lean forward to reach faucet 223.

In accordance with another embodiment, one or more mirrors are placed such that the passenger can reach and utilize those mirrors while seated on toilet assembly 210. Indeed, it is desirable for the other amenities such as paper towels, toilet paper, soap, tissues, waste bin, and the like to also be within arms-reach of the passenger when seated on toilet assembly 210. One or more hand bars (such as bar 340) may be provided to further provide passenger support during transfer and for other purposes. In one embodiment, one or more of these hand bars may be of the folding type—i.e., configured to fold close to a wall when not in use.

Figure 5:
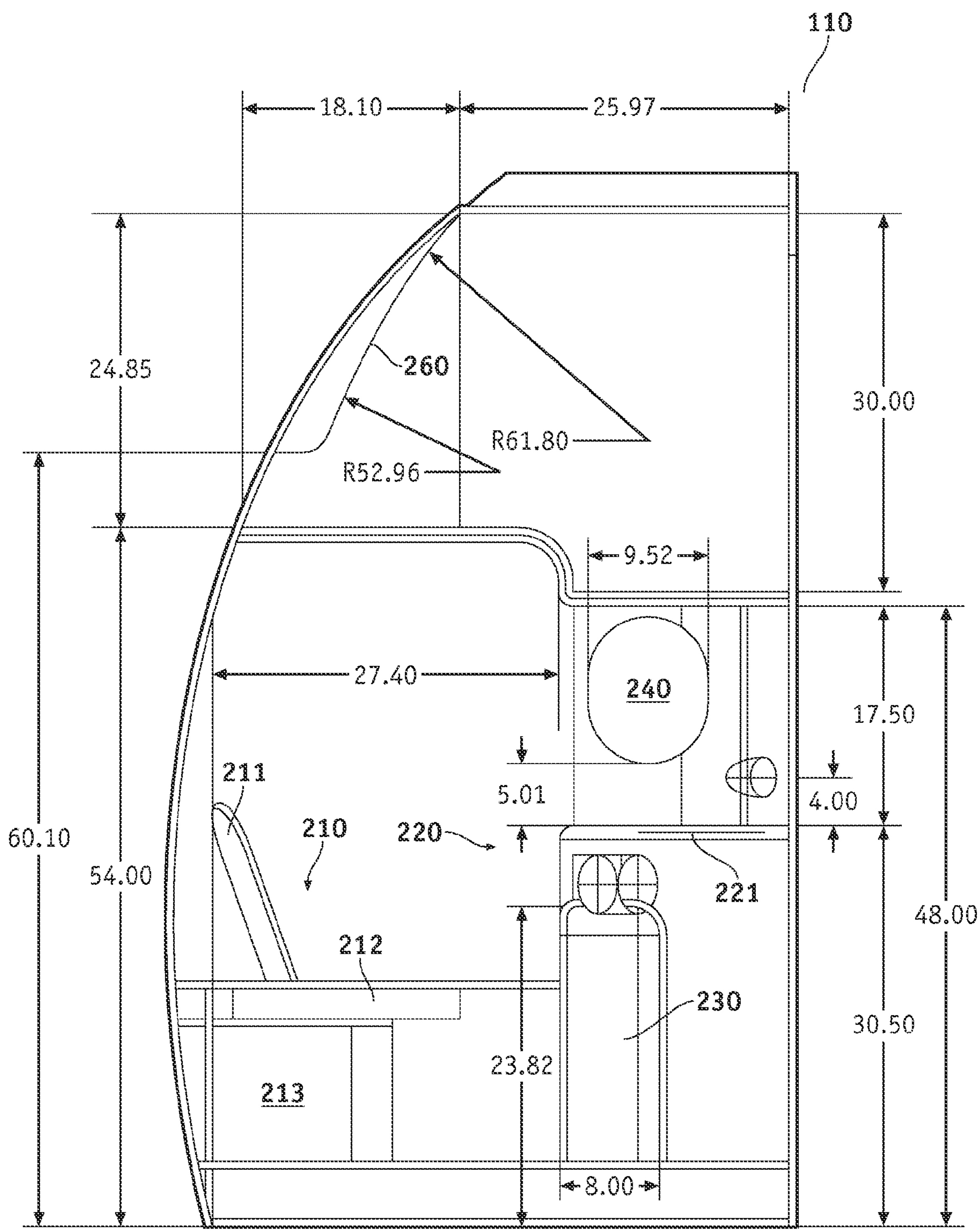
FIG. 5 is the side view of FIG. 2 with exemplary dimensions.

FIGS. 4 and 5 show the interior side and top views of FIGS. 2 and 3 with exemplary dimensions (in inches) superimposed thereon. Those skilled in the art are capable of readily and properly interpreting the various arrows, radiuses, and other dimensioning nomenclature used in these drawings. These figures are in no way meant to limit the range of geometries encompassed by the present embodiments, and are merely presented to show exemplary dimensions and, more generally, ratios of dimensions of a particular embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An aircraft lavatory comprising:

a wheelchair region;

a toilet assembly having a major axis laterally adjacent to and oriented at a non-zero angle with respect to a major axis of the wheelchair region, the toilet assembly including a seating surface, said wheel chair region laterally adjacent to said toilet assembly and opposite and aligned with a door, said wheel chair region and said toilet assembly major axis intersecting a generally planar wall disposed behind said wheel chair region and said toilet assembly; and a sink assembly adjacent to a leading edge of the toilet assembly, the sink assembly having a basin positioned at a predetermined height and a predetermined lateral distance with respect to the seating surface, wherein the predetermined height and the predetermined lateral distance are such that the basin is within arms-reach of a passenger positioned on the seating surface positioned on the seating surface, wherein the non-zero angle is an angle between the toilet assembly major axis and the wheelchair region major axis of about 8-12 degrees.

2. The aircraft lavatory of claim 1, wherein the predetermined distance and predetermined height are based on human being within the range of a $5^{th}$-percentile female and a $95^{th}$-percentile male.

3. The aircraft lavatory of claim 1, wherein the predetermined distance is between about 18 and 22 inches.

4. The aircraft lavatory of claim 1, wherein the predetermined height is between about 8 and 12 inches.

5. The aircraft lavatory of claim 1, further including at least one folding hand bar adjacent to the wheelchair region.

6. The aircraft lavatory of claim 1, further including at least one amenity positioned with arms-reach of the passenger.

7. The aircraft lavatory of claim 1, further including a mirror positioned such it can be utilized by the passenger while seated on the seating surface or within the wheelchair region.

8. The aircraft lavatory of claim 1, further including a center of said door generally aligned with the major axis of the wheelchair region.

9. A handicapped-accessible aircraft lavatory configured to fit within the hull of an aircraft, the lavatory having a wheelchair region configured to fit an on-board wheelchair, a toilet assembly having a major axis laterally adjacent to and oriented at an angle of about 8-12 degrees with respect to a major axis of the wheelchair region, said wheel chair region laterally adjacent to said toilet assembly and opposite and aligned with a door, said wheel chair region and said toilet assembly major axis intersecting a generally planar wall disposed behind said wheel chair region and said toilet assembly; and, a sink assembly adjacent to a leading edge of the toilet assembly, the sink assembly having a basin positioned at a predetermined height and a predetermined lateral distance with respect to the toilet assembly, wherein the predetermined height and the predetermined distance are selected such that the basin is within arms-reach of a human being in the range of a $5^{th}$-percentile female to a $95^{th}$ percentile male passenger sitting on the toilet assembly.

10. The handicapped-accessible aircraft lavatory of claim 9, wherein the predetermined distance is between about 18 and 22 inches.

11. The handicapped-accessible aircraft lavatory of claim 9, wherein the predetermined height is between approximately 13 and 14 inches.

12. The aircraft lavatory of claim 9, further including at least one hand bar adjacent to the wheelchair region.

13. The aircraft lavatory of claim 9, further including a mirror positioned such it can be utilized by the passenger while seated on the toilet assembly or within the wheelchair region.

14. The aircraft lavatory of claim 9, further including a center of said door substantially aligned with the major axis of the wheelchair region.

15. A method of manufacturing a lavatory within an aircraft, the method comprising:

defining a lavatory area within the aircraft;

defining a wheelchair region within the lavatory;

installing a toilet assembly within the lavatory area such that a major axis of said toilet assembly is laterally adjacent to and oriented at a non-zero angle with respect to a major axis of the wheelchair region, said wheel chair region laterally adjacent to said toilet assembly and opposite and aligned with a door, said wheel chair region and said toilet assembly major axis intersecting a generally planar wall disposed behind said wheel chair region and said toilet assembly, wherein the toilet assembly includes a toilet seat;

installing a sink assembly adjacent to a leading edge of the toilet assembly, the sink assembly having a basin positioned at a predetermined height and a predetermined lateral distance with respect to the toilet seat such that the sink assembly is within arms-reach of a passenger sitting on the toilet seat arm-reach of a passenger sitting on the toilet seat, wherein the non-zero angle is an angle between the toilet assembly major axis and the wheelchair region major axis of about 8-12 degrees.

16. The method of claim 15, wherein the sink assembly is installed such that it is within arms-reach of a human being ranging from a $5^{th}$-percentile woman to a $95^{th}$ percentile male.

17. The method of claim 15, wherein the predetermined height is between about 13 and 14 inches, and the predetermined distance is between about 18 and 22 inches.

* * * * *